US009336207B2

(12) United States Patent
Martinez Corria et al.

(10) Patent No.: US 9,336,207 B2
(45) Date of Patent: May 10, 2016

(54) MEASURING LINGUISTIC MARKERS AND LINGUISTIC NOISE OF A MACHINE-HUMAN TRANSLATION SUPPLY CHAIN

(71) Applicant: International Business Machines Corporation, Armonk, NY (US)

(72) Inventors: Alejandro Martinez Corria, Barcelona (ES); Francis X. Rojas, Austin, TX (US); Linda F. Traudt, Las Vegas, NV (US); Saroj K. Vohra, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 14/319,863

(22) Filed: Jun. 30, 2014

(65) Prior Publication Data
US 2015/0378990 A1  Dec. 31, 2015

(51) Int. Cl.
*G06F 17/28* (2006.01)
(52) U.S. Cl.
CPC .......... *G06F 17/289* (2013.01); *G06F 17/2836* (2013.01); *G06F 17/2854* (2013.01)
(58) Field of Classification Search
CPC ... G06F 17/289; G06F 17/28; G06F 17/2836; G06F 17/2854; G06F 17/2827; G06F 9/4448; G06F 17/2818; G06F 17/2872; G06F 17/3061; G06F 17/2785; G06F 17/2809; G06F 17/30669; G06F 17/275; G06F 17/2881; G10L 15/005; G10L 15/18; G10L 15/1815
USPC .......................... 704/1–10, 277, 251–257, 246
See application file for complete search history.

(56) References Cited

U.S. PATENT DOCUMENTS

| 7,383,542 | B2 | 6/2008 | Richardson et al. |
| 8,380,486 | B2 | 2/2013 | Soricut et al. |
| 2002/0111787 | A1* | 8/2002 | Knyphausen .......... G06Q 10/10 704/2 |
| 2004/0155869 | A1* | 8/2004 | Robinson .............. G06F 3/0219 345/168 |
| 2012/0284015 | A1 | 11/2012 | Drewes |

OTHER PUBLICATIONS

Temizoz, "Machine Translation and Postediting," European Society for Translation Studies, Research Committee, State-of-the-Art Research Reports, Mar. 2012, 19 pages.

* cited by examiner

*Primary Examiner* — Marivelisse Santiago Cordero
*Assistant Examiner* — Stephen Brinich
(74) *Attorney, Agent, or Firm* — VanLeeuwen & VanLeeuwen; Diana R. Gerhardt

(57) ABSTRACT

An approach is provided in which a linguistic analyzer engine generates a leverage value of a language translation supply chain that corresponds to an amount of suggested translations that are accepted by a professional linguist. The linguistic analyzer engine generates a factor value of the language translation supply chain that indicates a productivity of the user to convert the set of accepted translation into a set of final translations. In turn, the linguistic analyzer engine determines a performance efficiency of the language translation supply chain based upon the generated leverage value and the generated factor value, and evaluates the language translation supply chain accordingly. In one embodiment, the linguistic analyzer engine determines a performance efficiency of the language translation supply chain based on "n" distinct metric values associated with final translated segments.

20 Claims, 10 Drawing Sheets

|  | LAO Segmentation | LAO OUT/MT IN | MT OUT/PE IN |
|---|---|---|---|
| Original Segments | 1000 | 1000 | 1000 |
| Auto-Exact (AE) Match | 0 | 400 | 400 |
| Exact Match (EM) | 0 | 200 | 200 |
| Fuzzy Match (FM) | 0 | 200 | 200 |
| Machine Translation (MT) | 0 | 0 | 180 |
| No Match | 0 | 200 | 20 |

FIG. 2

MEASURING LINGUISTIC MARKERS AND LINGUISTIC NOISE OF A MACHINE-HUMAN TRANSLATION SUPPLY CHAIN

BACKGROUND

A company typically develops web pages in a native language (e.g., English) and subsequently employs a language translation service to translate the company's web pages into different languages (e.g., Spanish, Russian, etc.). Language translation services typically utilize a translation supply chain that includes an integration of linguistic assets/corpuses, translation automated systems, computer-aided translation editors, professional linguists, and operational management systems. The translation supply chain typically includes a language asset optimization stage, a machine translation stage, and a post-editing stage.

The language asset optimization stage parses source content into source segments then searches a repository of historical linguistic assets for the best suggested translations per language and per domain. Linguistic assets may be historical translation memories (bi-lingual segment databases), dictionaries, and/or language specific metadata to optimize downstream stages. The machine translation stage customizes a translation model using domain specific linguistic assets of a given language and provides machine-generated suggested translations of original content based upon the customized translation model.

In turn, the post-editing stage provides the suggested translations to a professional linguist via a computer-aided translation editor. The professional linguist accepts one of the suggested matching translations, modifies one of the suggested matching translations, or generates a completely new translation and delivers final human fluent translated content to the company.

BRIEF SUMMARY

According to one embodiment of the present disclosure, an approach is provided in which a linguistic analyzer engine generates a leverage value of a language translation supply chain that corresponds to an amount of suggested translations that are accepted by a professional linguist. The linguistic analyzer engine generates a factor value of the language translation supply chain that indicates a productivity of the user to convert the set of accepted translation into a set of final translations. In turn, the linguistic analyzer engine determines a performance efficiency of the language translation supply chain based upon the generated leverage value and the generated factor value, and evaluates the language translation supply chain accordingly. In one embodiment, the linguistic analyzer engine determines a performance efficiency of the language translation supply chain based on "n" distinct metric values associated with final translated segments.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 2 is an exemplary diagram depicting a table showing a translation match progression through a translation supply chain;

DETAILED DESCRIPTION

Figure 1:
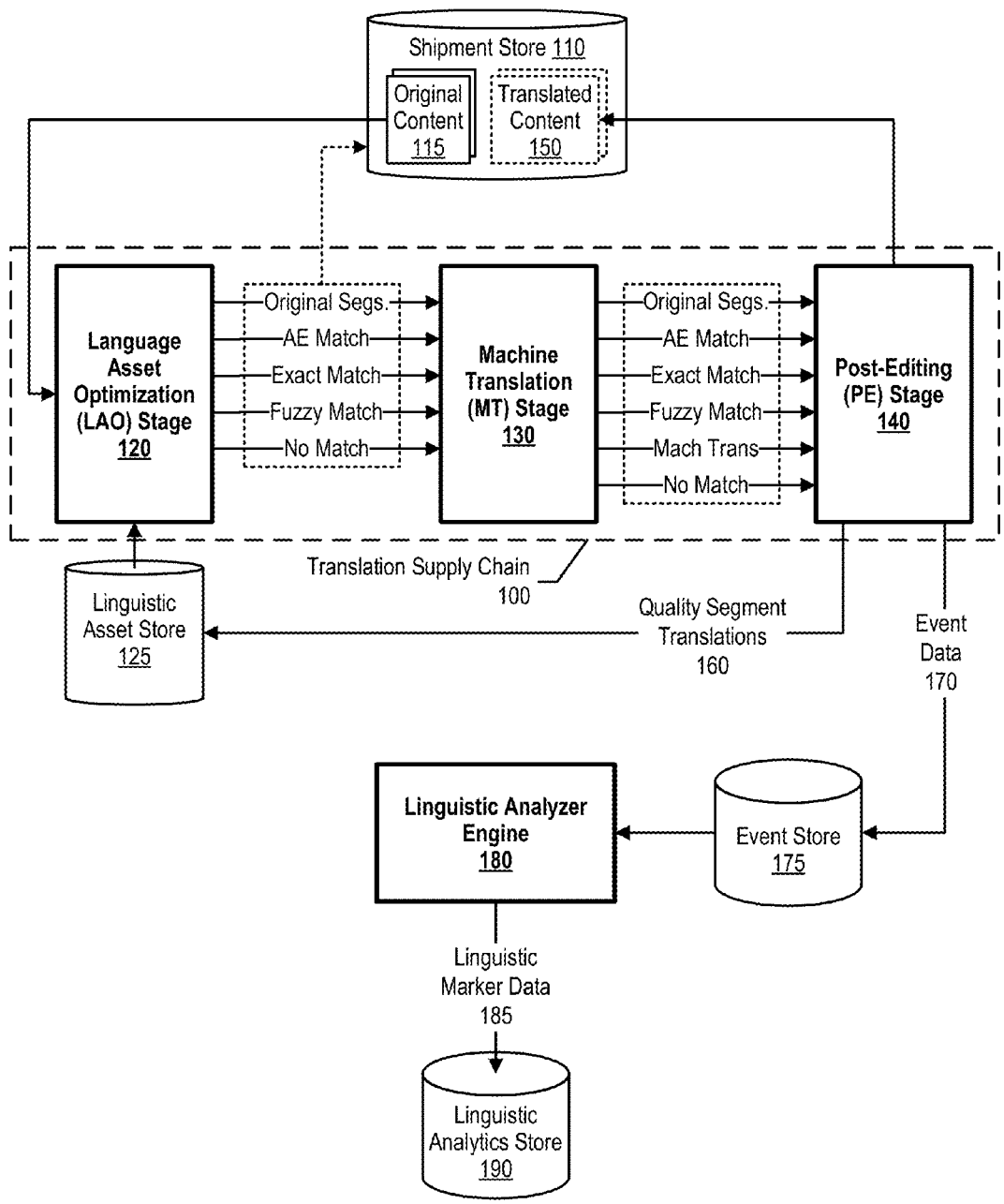
FIG. 1 is an exemplary diagram depicting a translation supply chain and a linguistic analyzer engine that determines a performance efficiency of the translation supply chain.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 is an exemplary diagram depicting a translation supply chain and a linguistic analyzer engine that determines a performance efficiency of the translation supply chain. Translation supply chain 100, is a language translation supply chain that includes various stages of translating original content written in a first language to translated content written in a second language, such as translating a web page written in English to a web page written in Spanish. The example in FIG. 1 shows that translation supply chain 100 includes language asset optimization stage 120, machine translation stage 130, and post-editing stage 140. As discussed in more detail below, this disclosure provides a systematic approach for measuring linguistic noise within translation supply chain 100 to optimize components and operational assets/resources accordingly.

Translation supply chain 100 receives shipment store 110 as part of a translation request. In turn, language asset optimization stage 120 retrieves original content 115 from shipment store 110 to commence the translation process. In one embodiment, a "shipment" is a translation work order that includes original content of multiple documents, multiple strings, and/or web pages. Language asset optimization stage 120 parses original content 115 into segments via a segmentation process and then compares each original segment against multiple historical translation segments included in linguistic asset store 125 to identify suggested translations, which are also referred to herein as "matches" (see FIG. 4 and corresponding text for further details). In one embodiment, during the parsing process, language asset optimization stage 120 generates multiple segment sizes corresponding to the amount of words in a segment (e.g., small, medium, large). In another embodiment, language asset optimization stage 120 classifies suggested translations, and stores corresponding metadata, into one of the following categories:

Auto Exact (AE) match: Original segment is an exact match of at least one historical source segment translation associated with the same document name. In one embodiment, language asset optimization stage 120 automatically stores auto exact matches in shipment store 110 without any corrections needed by a professional linguist via post-editing stage 140;

Exact matches (EM): Original segment is an exact match of at least one historical source segment translation associated with different documents (e.g., source context). Since the context (document) of the matching segment is different, a professional linguist reviews the exact match and either confirms no variance in the target translation or corrects contextual variance in the target translation;

Fuzzy Match (FM): Original segment is "similar" to at least one historical source segment translation. As such, the professional linguist reviews the match and either confirms no variance in the target language or corrects any contextual variances in the pre-existing translation; and No Match (NP): Language asset optimization stage 120 does not locate an AE, EM, FM or other match type for an original segment.

Language asset optimization stage 120 stores auto exact matches, exact matches, and fuzzy matches in shipment store 110 to assist and optimize multiple downstream components and deliver human fluent translations. In one embodiment, post-editing stage 140 displays the exact matches and fuzzy matches as "suggested matches" because a professional linguist is required to accept and correct one of the suggested matches before the suggested matches are stored as a final translation (see FIG. 6 and corresponding text for further details).

Figure 5:
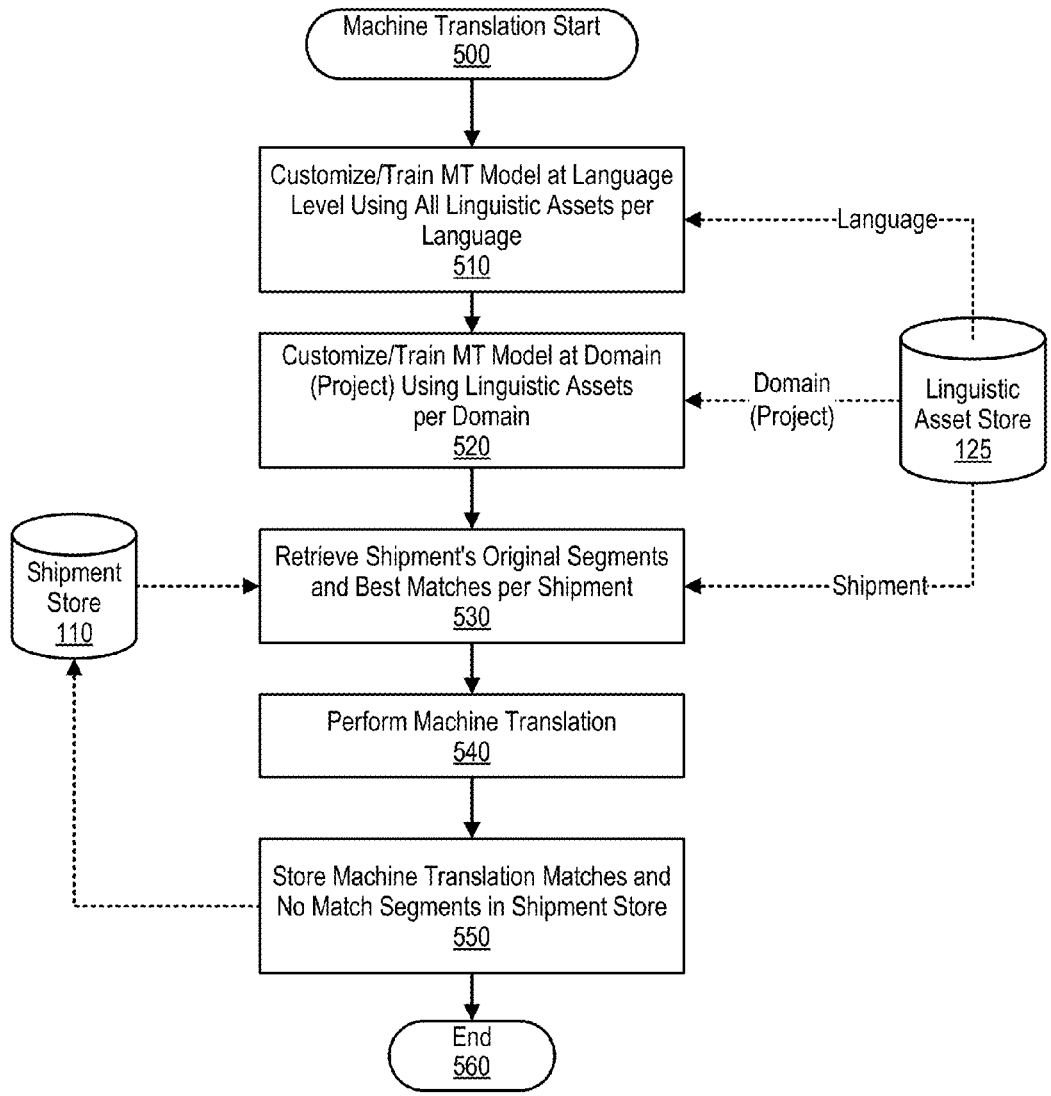
FIG. 5 is an exemplary flowchart depicting steps taken by a machine translation stage to customize a machine translation model and translate original segments into a different language using the customized machine translation model.

Machine translation stage 130 customizes a translation model using historical translation information and then uses the customized translation model to generate translation matches for the original segments (see FIG. 5 and corresponding text for further details). The generated translation matches are referred to herein as "machine translations (MT)," which post-editing stage 140 also considers as "suggested matches" because the professional linguist may accept and correct a machine translation before the machine translation is stored as a final human fluent translation.

In one embodiment, machine translation stage 130 generates a machine translation for original segments having no matches from language asset optimization stage 120. In another embodiment, machine translation stage 130 generates a machine translation for each original segment having no matches as well as segments having fuzzy matches. In this embodiment, linguistic analyzer engine 180 compares the efficiency of the machine translations generated by machine translation stage 130 with the efficiency of fuzzy matches generated by language asset optimization stage 120.

Figure 6:
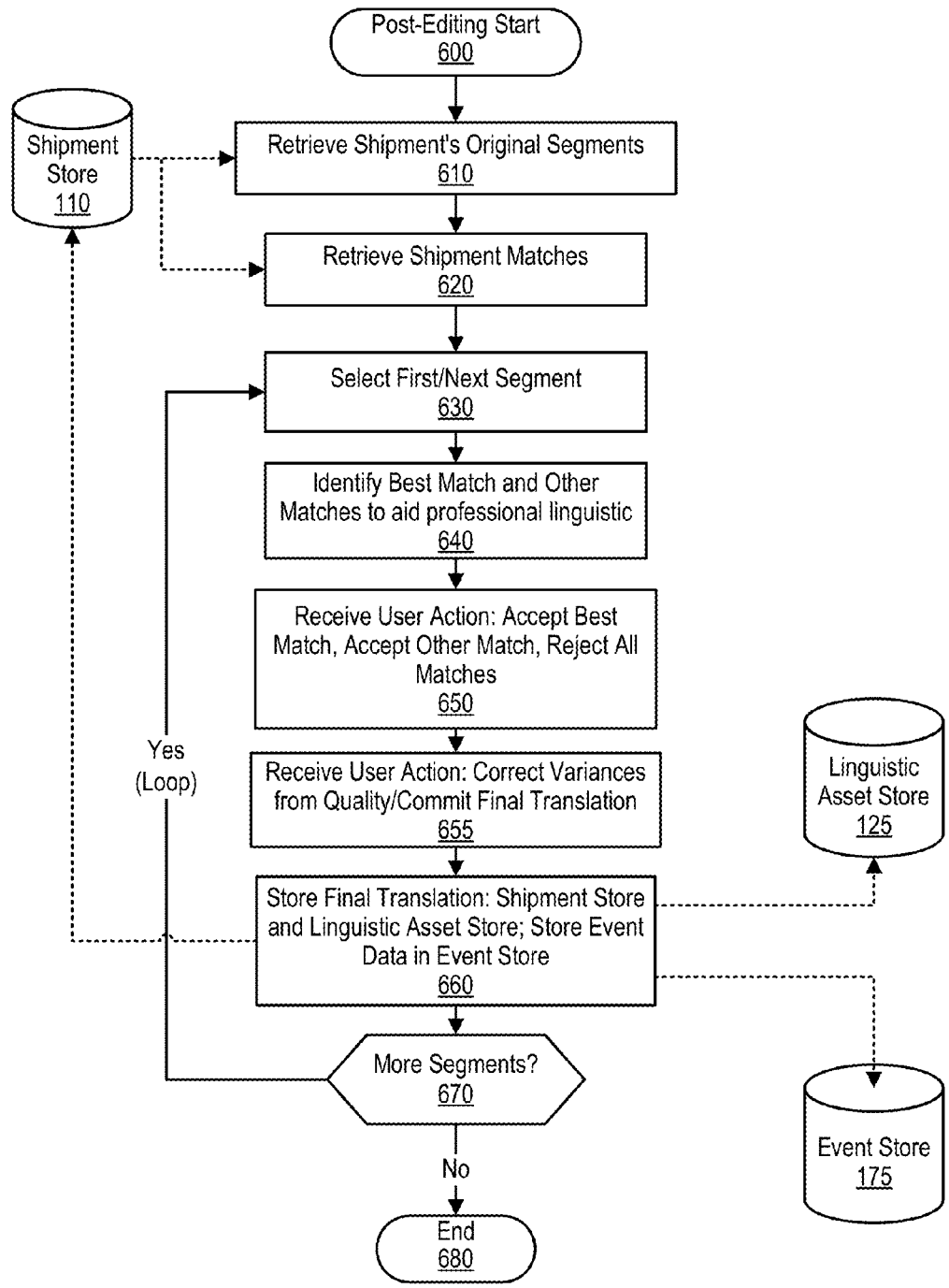
FIG. 6 is an exemplary flowchart depicting steps taken by a post-editing stage that provides suggested translation matches to a professional linguist and stores final translations determined by the professional linguist.

Post-editing stage 140 uses a computer-aided translation editor to display the suggested translation matches to a professional linguist and special translation editing keys to assist the professional linguist to generate final human-fluent translations, which are stored as translated content 150 in shipment store 110 (see FIG. 6 and corresponding text for further details). Post-editing stage 140 also stores quality segment translations 160 in linguistic asset store 125 to improve language asset optimization stage 120's subsequent translation proficiency.

In addition, post-editing stage 140 tracks usage of the special translation editing keys and stores the tracking information as event data 170 in event store 175, which includes log information such as the number of suggested matches accepted by the professional linguist and the amount of time taken by the professional linguist to accept final translations. Linguistic analyzer engine 180 retrieves event data 170 and generates linguistic marker data 185 that, in one embodiment, corresponds to a multi-dimensional linguistic noise coordinate system to measure noise over a set of events within translation supply chain 100 (stored in linguistic analytics store 190, see FIG. 8 and corresponding text for further details). In one embodiment, linguistic marker data 185 may correspond to a two-dimension space consisting of a post-editing factor value and a post-editing leverage value. The post-editing factor value, in one embodiment, is a normalized measurement of professional linguist productivity during post-editing stage 140 to perform translations with the aid of a specific match type, or other aids normalized against a base productivity performed without aids. The post-editing leverage value, in one embodiment, is a measurement of accepted matches by the professional linguist during post-editing stage 140 (see FIGS. 7, 8, and corresponding text for further details).

Figure 8:
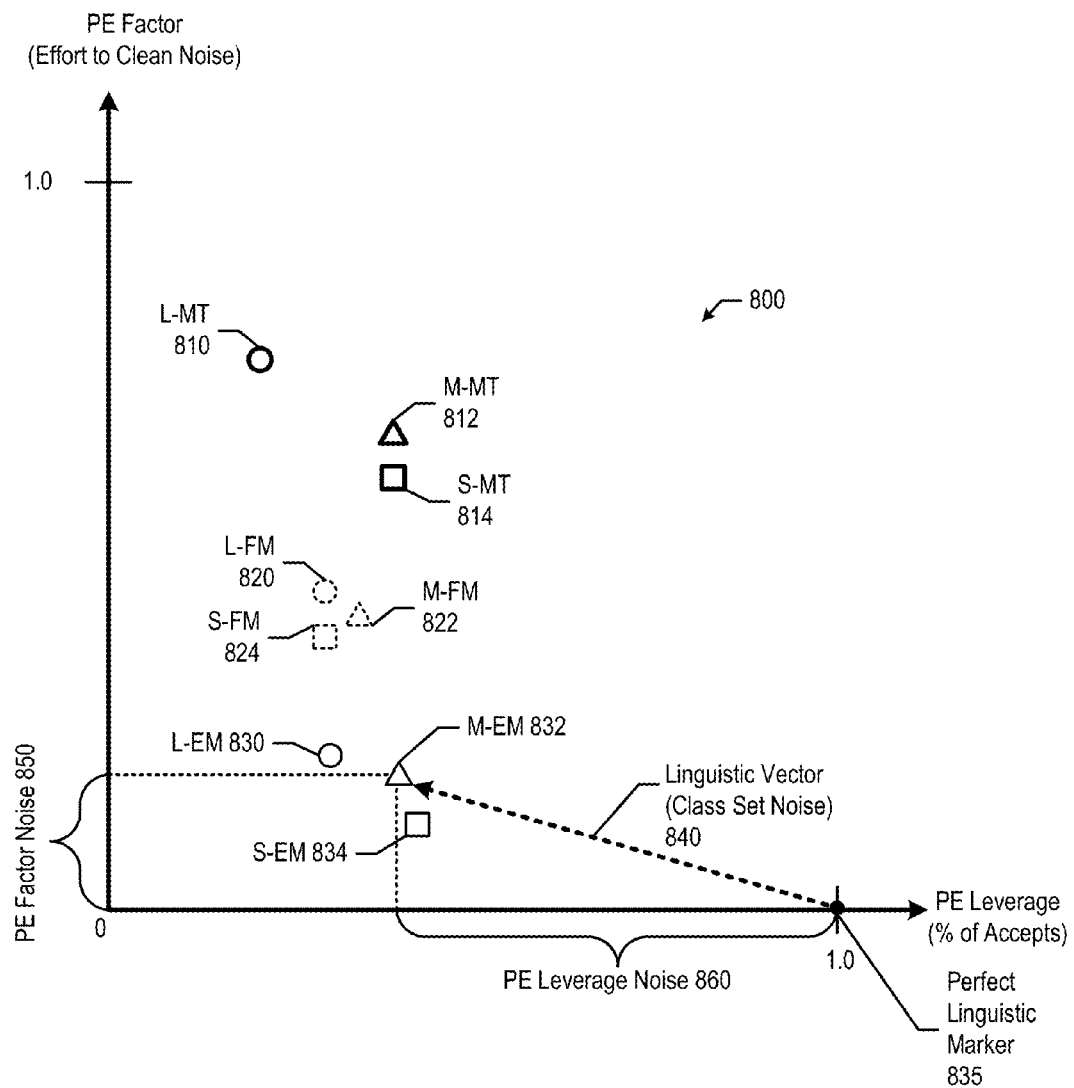
FIG. 8 is an exemplary diagram depicting a two-dimensional graphical representation of a multi-dimensional linguistic noise coordinate system.

Referring to FIG. 8, linguistic markers are compared to Perfect Linguistic Marker (PLM) 835, which includes a post-editing leverage value of 1.0 (x-axis) and a post-editing factor value of 0.0 (y-axis). The post-editing leverage value of 1.0 corresponds to a professional linguist accepting 100% of suggested matches and a post-editing factor value of 0.0 corresponds to the professional linguist requiring zero mechanical effort (no changes) to achieve human-fluent translations (see FIG. 8 and corresponding text for further details). As such, the distance from a linguistic marker to PLM 835 represents the noise (errors) introduced across the various translation stages of translation supply chain 100.

Using the linguistic markers corresponding to the set of events performed within translation supply chain 100, linguistic analyzer engine 180 and an operational team determines the translation supply chain noise of translation supply chain 100. In one embodiment, the translation supply chain noise represents a singular measurement computed by weighting the total number of words translated within the translation supply chain by the distance of the corresponding linguistic markers to the PLM. In this embodiment, the translation supply chain noise measurement indicates a cumulative measurement of all noise measurements within translation supply chain 100. As such, linguistic analyzer engine 180 and the operational team adjust translation supply chain 100 accordingly for optimal efficiency.

In one embodiment, linguistic analyzer engine 180 and the operational team evaluate the way in which changes in operational assets/resources and components affect patterns in translation supply chain linguistic noise measurements. For example, the operational team may quantify changes in the supply chain noise as various machine translation service providers are added/deleted in translation supply chain 100 or as linguistic asset optimization stage 120 utilizes various linguistic assets.

FIG. 2 is an exemplary diagram depicting a table showing a translation match progression through a translation supply chain. Table 200 includes relative quantity matches and, as those skilled in the art can appreciate, original content may include more or less original segments, along with different matching type ratios, than that shown in FIG. 2.

Table 200 includes column 220, which shows that the language asset optimization stage parses original content into 1,000 original segments. Column 230 shows that the language asset optimization stage identified 400 segments with auto-exact matches, 200 segments with exact matches, and 200 segments with fuzzy matches. As such, 200 segments remain with no match after the language asset optimization stage.

Column 240 shows that the machine translation stage designates 20 segments of the 200 segments as placebo segments and generates 180 machine translations. In turn, the professional linguist may not review the 400 auto exact matches, but reviews and corrects the 200 segments with exact matches, the 200 segments with fuzzy matches, the 180 segments with machine translations, and manually translates the 20 (placebo) segments with no matches. In one embodiment, the machine translation stage designates the placebo segments so linguistic analyzer engine 180 has a baseline set of segments from which to normalize the productivity of other suggested match types.

Figure 3:
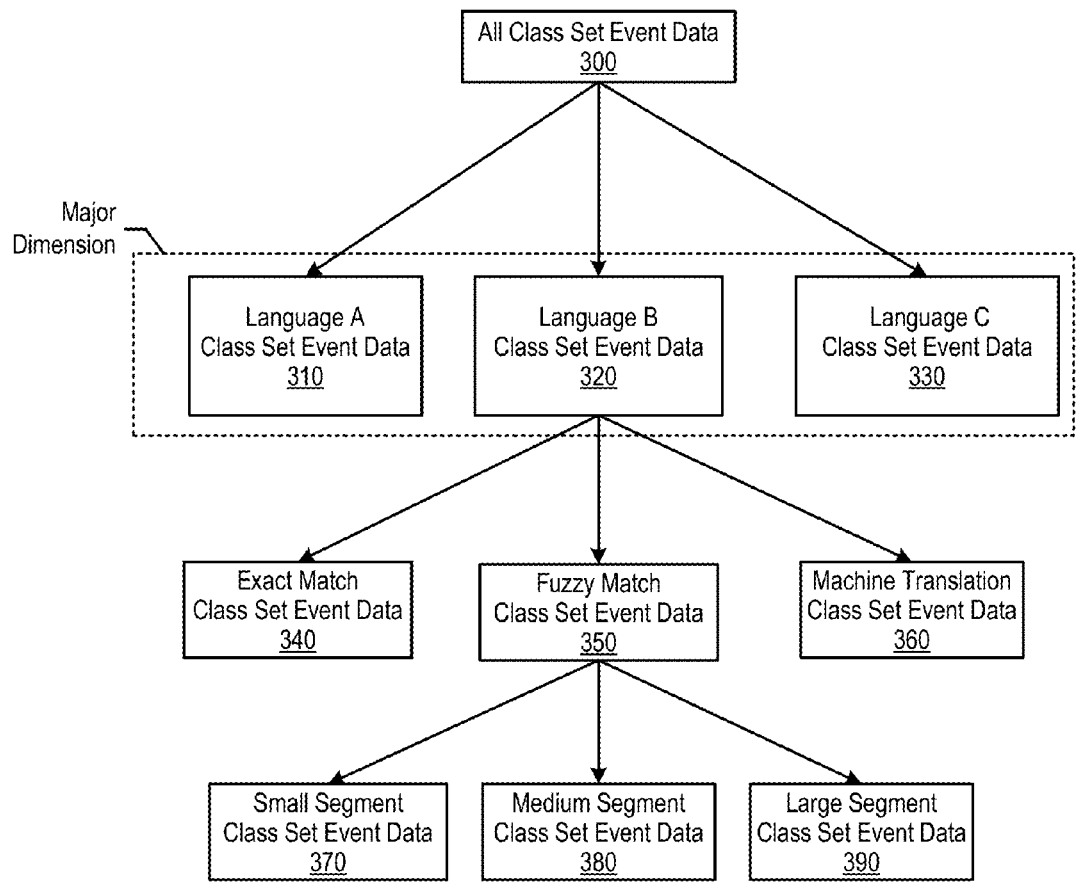
FIG. 3 is an exemplary diagram depicting an example of a class set event data hierarchy.

FIG. 3 is an exemplary diagram depicting an example of a class set event data hierarchy. As discussed herein, a "class set" is a whole space of event data and a "subset" of the class set is a child class set. FIG. 3 shows that class set event data 300 includes multiple language class set event data 310, 320, and 330, which are at a major dimension hierarchy level (e.g., "LANGUAGE"). Within each language class set exists multiple child class sets. FIG. 3 shows three match type child class sets of exact match class set event data 340, fuzzy match class set event data 350, and machine translation class set event data 360. Although not shown, each of language class set event data 310, 320, and 330 may have a similar hierarchy of child class sets.

Continuing down the hierarchy tree, each match type child class set may have child class sets according to segment size. FIG. 3 shows that fuzzy match class set event data 350 has multiple segment size child class sets, which are small segment class set event data 370, medium segment class set event data 380, and large segment class set event data 390. In one embodiment, small segments may include one to four words, medium segments may include five to fourteen words, and large segments may include greater than fourteen words.

Figure 4:
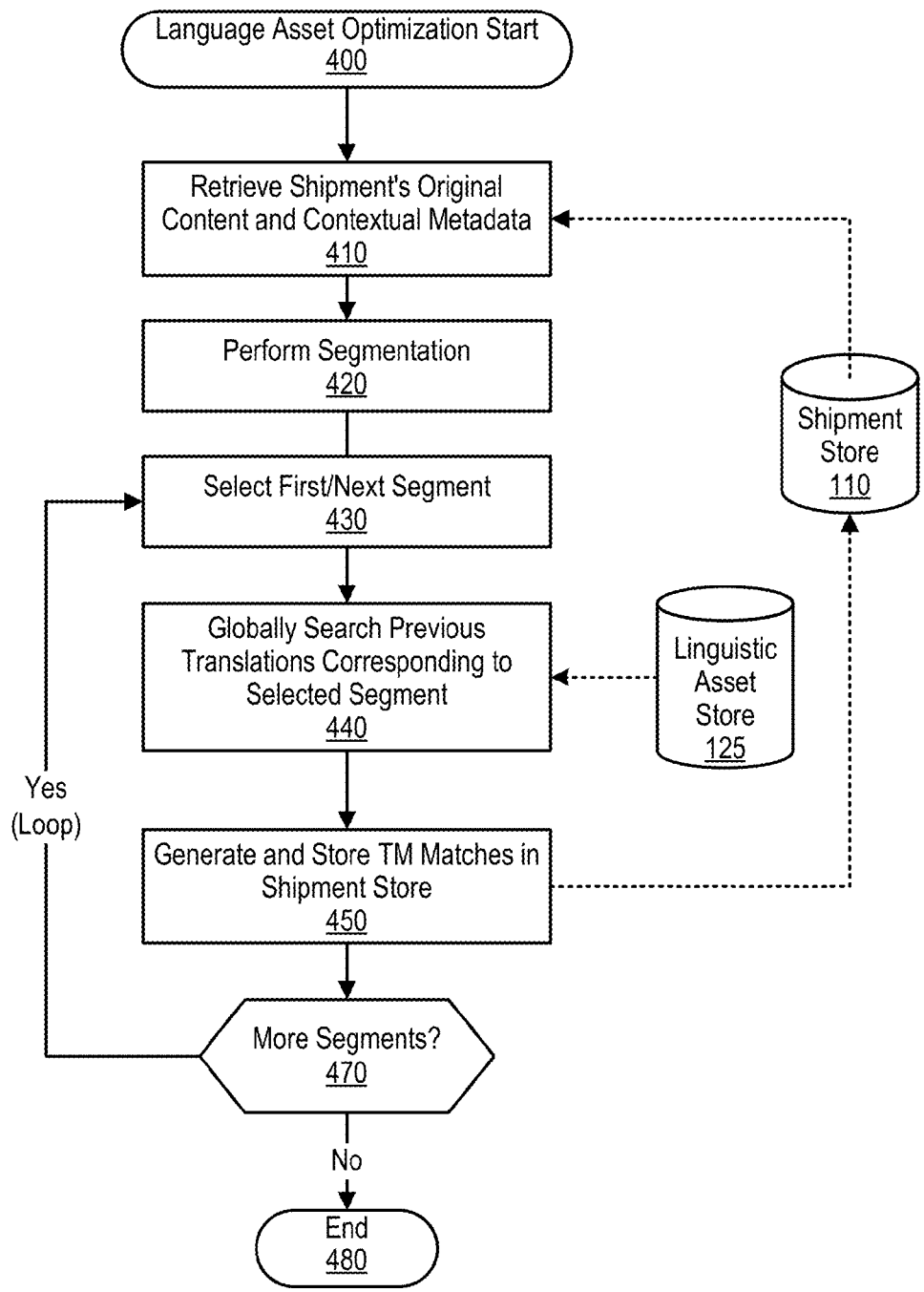
FIG. 4 is an exemplary flowchart depicting steps taken by a language asset optimization stage to generate suggested matches for original segments partitioned from original content.

FIG. 4 is an exemplary flowchart depicting steps taken by a language asset optimization stage to generate suggested matches for original segments partitioned from original content. The language asset optimization stage parses new content (original content) into segments via a segmentation process and then compares each new segment against multiple historical translation segments to locate a matching translation. The historical translation segments include previous translations indexed by contextual metadata keys such as document version, brand, project, domain, etc.

Language asset optimization stage processing commences at 400, whereupon the language asset optimization stage retrieves original content and contextual metadata from shipment store 110 (step 410). The contextual metadata may identify, for example, the original content's domain, brand, industry, etc. At step 420, the language asset optimization stage parses the original content into original segments.

At step 430, the language asset optimization stage selects a first segment at 430, and performs a global search on historical translations stored in linguistic asset store 125 to locate a translation of the selected segment (step 440). When the language asset optimization stage identifies a match meeting a quality threshold, the language asset optimization stage stores the match in shipment store 110 at step 450. In one embodiment, the language asset optimization stage classifies translation memory matches into at least three classes such as auto-exact match, exact match, and fuzzy match as discussed above.

The language asset optimization stage determines whether there are more original segments to analyze and compare against historical translations (decision 470). If there are more original segments to analyze, decision 470 branches to the "Yes" branch, which loops back to select and process the next segment. This looping continues until there are no more original segments to evaluate, at which point decision 470 branches to the "No" branch, whereupon language asset optimization stage processing ends at 480.

FIG. 5 is an exemplary flowchart depicting steps taken by a machine translation stage to customize a machine translation model and translate original segments into a different language using the customized machine translation model. In one embodiment, the machine translation stage uses linguistic and statistical technology to provide the best (most accurate) machine translation match per original segment (see FIG. 6 and corresponding text for further details). In this embodiment, the machine translation stage may customize the machine translation model to specific domains (e.g., subject areas, technologies, etc.) per languages.

Machine translation stage processing commences at 500, whereupon the machine translation stage customizes the machine translation model at a language level (e.g., Spanish) using linguistic assets corresponding to the particular language from linguistic asset store 125 (step 510). At step 520, the machine translation stage customizes the machine translation model at a project domain level using linguistic assets corresponding to project domain included in linguistic asset store 125, such as a "computing" domain.

In some embodiments, the machine translation stage may use technologies such as Statistical Machine Translation (SMT), Rule Based Machine Translation (RBMT), or Hybrid Machine Translation (HMT) to optimize the machine translation engine. SMT uses a translation database that includes final human fluent translations previously quantified by human professional linguists. RBMT establishes special lexicon, morphological, grammatical, syntactic and custom rules tailored to the language under translation. HMT uses a combination of learning memories and rules.

In another embodiment, the machine translation stage strives to optimize the quality of the machine translation matches per domain per language by using custom learning linguistic assets (quality translation memories) per domain per language, using custom linguistic rules per domain per language, and/or pre-existing knowledge of linguistic patterns. In this embodiment when perfect linguistic assets and/or linguistic rules per domain per language are utilized, the machine translation stage should provide 100% human-fluent domain specific translations. However, linguistic assets, linguistic rules and customization tasks all contribute errors or "linguistic noise" that prevents the machine translation stage from delivering perfect human fluent translations (discussed below).

At step 530, the machine translation stage retrieves original segments and best matches per shipment from linguistic asset store 125, and performs machine translations on the retrieved segments at step 540. At step 550, the machine translation stage stores the machine translation matches in shipment store 110. Machine translation processing ends at 560.

FIG. 6 is an exemplary flowchart depicting steps taken by a post-editing stage that provides suggested translation matches to a professional linguist and stores final translations determined by the professional linguist. During the post-editing stage, the professional linguist evaluates suggested matches to determine a best translation match. In one embodiment, the professional linguist uses a computer-aided translation editor to cycle through each original segment to produce a final human-fluent translation for each original segment. In this embodiment, the computer-aided translation editor aids the professional linguist by displaying the best suggested translation for each new segment, such as displaying an exact match over a fuzzy match. In turn, the professional linguist may accept the best match or reject all matches and correct/edit the final translation, which the post-editing stage stores as a final human-fluent translation.

Post-editing stage processing commences at 600, whereupon the post-editing stage retrieves the shipment's original segments (step 610) and the suggested matches (step 620) from shipment store 110. The professional linguist selects the first segment at 630 and the computer-aided translation editor identifies a best match case at step 640. For example, the computer-aid translation editor selects an exact match over a fuzzy match as the best match.

At step 650, the post-editing stage receives a user action of accepting the best match, accepting one of the other matches, or rejecting all the matches. The post-editing stage, at step 655, receives corrections from the professional linguist and corrects the selected match. In turn, the post-editing stage stores the final translation in shipment store 110 to return to the shipment owner at step 660. In addition, the post-editing stage stores the final translated content in linguist asset store 125 to improve future translations, and stores editing event data into event store 175 for subsequent analysis (see FIG. 7 and corresponding text for further details).

The post-editing stage determines whether there are more segments to evaluate (decision 670). If there are more segments to evaluate, decision 670 branches to the "Yes" branch, which loops back to select and process the next segment. This looping continues until there are no more segments to evaluate, at which point decision 670 branches to the "No" branch, whereupon processing ends at 680.

In another embodiment, a localization service provider (LSP) uses the total time for post-editing and the total number of words post-edited to sample productivity over a set of post-editing events. In this embodiment, the LSP collects editing event data into log data and then provides the log data to a backend business analytical process, which assesses the productivity gained from a professional linguist selecting specific match types. In this embodiment, the log data may include the number of words per segment, time to complete each translation, number of keystrokes entered per translation, type of match accepted, and the best match type proposed per segment (e.g., exact match, fuzzy match, or machine translation).

Figure 7:
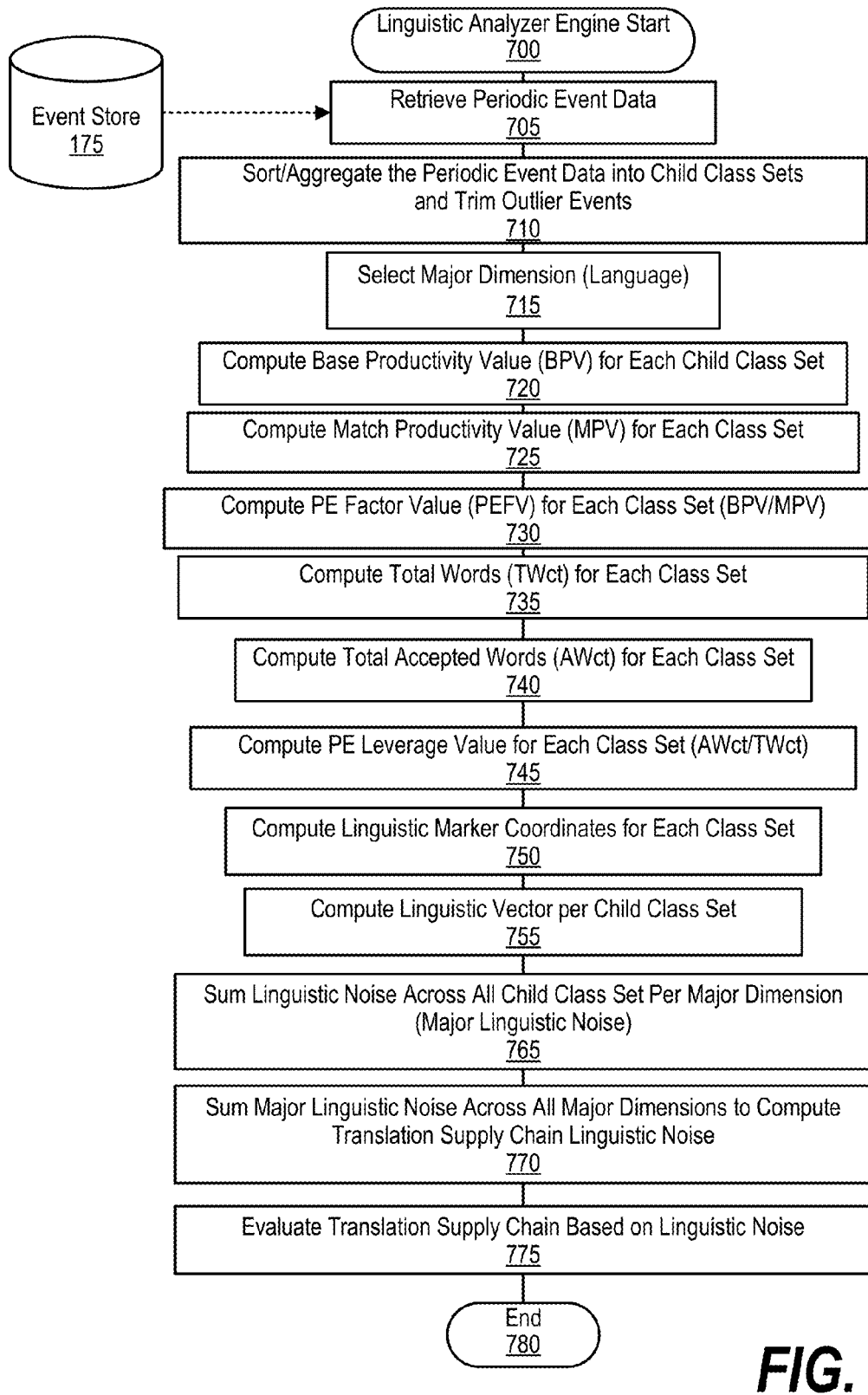
FIG. 7 an exemplary flowchart depicting steps taken by a linguistic analyzer engine to analyze translation log data and determine linguistic noise in a translation supply chain.

FIG. 7 an exemplary flowchart depicting steps taken by a linguistic analyzer engine to analyze translation log data and determine linguistic noise in a translation supply chain.

Linguistic analyzer engine processing commences at 700, whereupon the linguistic analyzer engine retrieves periodic event data, such as sample event data over 12 months, from editing event store 175 (step 705). The linguistic analyzer engine sorts/aggregates the periodic event data into child class sets at step 710 (see FIG. 3 and corresponding text for further details). In one embodiment, the linguistic analyzer engine "trims" each child class set by removing outlier "slow" events and outlier "fast" events (e.g., at 5 and 95 percentiles of the child class sets).

The linguistic analyzer engine selects a major dimension at step 715, such as a language, and computes a placebo baseline productivity value (BPV) at step 720 for the placebo baseline child class set using a formula such as:

$$\text{NP\_Productivity}_S = \bigcup_S \left( \sum_{i=1}^{n} \text{NP\_WORDS}_S / \sum_{i=1}^{n} \text{NP\_TIME}_S \right)$$

where S=each segment size [small, medium, large], and n=number of events within the set [S].

At step, 725, the linguistic analyzer engine computes a match productivity value (MPV) for each child class set (child class match productivity value) using on formulas such as:

$$\text{EM\_Productivity}_S^M = \bigcup_S^M \left( \sum_{i=1}^{n} \text{EM\_WORDS}_S^M / \sum_{i=1}^{n} \text{EM\_TIME}_S^M \right)$$

$$\text{FM\_Productivity}_S^M = \bigcup_S^M \left( \sum_{i=1}^{n} \text{FM\_WORDS}_S^M / \sum_{i=1}^{n} (\text{FM})\_\text{TIME}_S^M \right)$$

$$\text{MT\_Productivity}_S^M = \bigcup_S^M \left( \sum_{i=1}^{n} \text{MT\_WORDS}_S^M / \sum_{i=1}^{n} \text{MT\_TIME}_S^M \right)$$

where M=each MAJORKEY per major dimension (first child dimension of parent dimension), m=number of events per MAJORKEY per segment scope size, and n=number of events within the set [M,S].

In turn, the linguistic analyzer engine computes a post-editing factor value for each child class set (child class factor value) at step 730. In one embodiment, PEFVs are computed for specific class sets using formulas such as:

$$\text{EM\_Factor}_S^M = \bigcup_S^M \text{NP\_Productivity}_S / \text{EM\_Productivity}_S^M$$

$$\text{FM\_Factor}_S^M = \bigcup_S^M \text{NP\_Productivity}_S / \text{FM\_Productivity}_S^M$$

$$\text{MT\_Factor}_S^M = \bigcup_S^M \text{NP\_Productivity}_S / \text{MT\_Productivity}_S^M$$

where m=number of events per MAJORKEY per segment scope size. In one embodiment, the PEFV is a measurement of mechanical effort by the professional linguist during post-editing needed to eliminate noise (error) in the selected matches. In another embodiment, the PEFV is a measurement of "normalized professional linguist productivity" during post-editing, such as translations performed with the aid of a specific match types or other aids.

At step 735, the linguistic analyzer engine computes the total words (TWct) in each child class set and computes the total accepted words (AWct) in each child class set (step 740) using formulas such as:

$$EM\_Total\_Words_S^M = \bigcup_S^M \sum_{i=1}^n EM\_Words_S^M$$

$$FM\_Total\_Words_S^M = \bigcup_S^M \sum_{i=1}^n FM\_Words_S^M c$$

$$MT\_Total\_Words_S^M = \bigcup_S^M \sum_{i=1}^n MT\_Words_S^M$$

$$EM\_Accept\_Words_S^M = \bigcup_S^M \sum_{i=1}^n \left( EM\_Words \bigcap_S^M [Accept = Yes] \right)$$

$$FM\_Accept\_Words_S^M = \bigcup_S^M \sum_{i=1}^n \left( FM\_Words \bigcap_S^M [Accept = Yes] \right)$$

$$MT\_Accept\_Words_S^M = \bigcup_S^M \sum_{i=1}^n \left( MT\_Words \bigcap_S^M [Accept = Yes] \right)$$

Using the AWct and TWct, the linguistic analyzer engine computes a post-editing leverage value (PELV) for each class set (PELV=AWct/TWct) at step 745 (child class leverage value) using formulas such as:

$$EM\_Leverage_S^M = EM\_Accept\_Words_S^M / EM\_Total\_Words_S^M$$

$$FM\_Leverage_S^M = FM\_Accept\_Words_S^M / FM\_Total\_Words_S^M$$

$$MT\_Leverage_S^M = MT\_Accept\_Words_S^M / MT\_Total\_Words_S^M$$

In one embodiment, the PELV is a measurement of acceptance of matches by the professional linguist during post-editing. In this embodiment, the PELV is a measurement such that 1.0 indicates that the professional linguist selected 100% of the suggested translations provided for the aided class data set. For example, if a human translator chooses 50% of the suggested translations (measured in total words accepted), then a value of "0.5" statistically measures the quality of matches provided to the professional linguist based on human cognitive judgment.

At step 750, the linguistic analyzer engine computes linguistic markers (LM) using the PELV and PEFV along with other metrics using formulas such as:

$$LinguisticMarker_S^M = \begin{bmatrix} [EM\_Leverage_S^M, EM\_Factor_S^M] \\ [FM\_Leverage_S^M, FM\_Factor_S^M] \\ [MT\_Leverage_S^M, MT\_Factor_S^M] \end{bmatrix}$$

In one embodiment, the linguistic markers are coordinates for graphing the professional linguist's acceptance of matches relative to the professional linguist's productivity (see FIG. 8 and corresponding text for further details).

In another embodiment, the closer the coordinates of a linguistic marker are to coordinates of a Perfect Linguistic Marker (PLM) [1.0,0.0], the less noise is present in the translation supply chain. As such, the linguistic analyzer engine may identify and provide analytical feedback using the linguistic markers whose coordinates are furthest away from the PLM. In addition, the linguistic analyzer engine may analyze a set of linguistic markers across the set of match types per segment scope size. By analyzing the relationship between these sets of linguistic markers, the linguistic analyzer engine identifies patterns such as:

small PE:Factor<medium PE:Factor<large PE:Factor; and exact match PE:Factor<fuzzy match PE:Factor<machine translation PE:Factor.

The linguistic analyzer engine may also determine that the post-editing factor value increases if the post-editing leverage value is too high. In other words, a professional linguist's productivity may suffer when the professional linguist selects too many bad matches for which to edit.

In yet another embodiment, the linguistic analyzer engine may build statistical models to assess and identify patterns between exact match linguistic markers, fuzzy match linguistic markers and machine translation linguistic markers. This analysis aids an operational team to establish benchmarks and boundary exception conditions to pinpoint indicators of high levels of noise in the operational assets/resources and/or components.

In yet another embodiment, the linguistic analyzer engine may identify a subset of shipments, from a large set of shipments, with the worst linguistic markers and analyze the corresponding document levels to identify the subset of documents with the worst linguistic markers. In this embodiment, the linguistic analyzer engine may traverse into the multiple segments with the worst linguistic marker coordinates and quickly identify/qualify the worst match types within the MAJORKEY and help make investment decisions on whether to correct the issues.

At step 755, the linguistic analyzer engine computes a linguistic vector per class (child class linguistic vector) set using formulas such as:

$$_TVector_S^M = \sqrt{_TFactor^2 + (1 - _TLeverage)^2}\,_S^M$$

$$LinguisticVector_S^M = \begin{bmatrix} [EM\_Vector_S^M] \\ [FM\_Vector_S^M] \\ [MT\_Vector_S^M] \end{bmatrix}$$

where T=Match Type [EM, FM, MT]. In one embodiment, the linguistic vector is a measurement of distance from a linguistic marker to the Perfect Linguist Marker (see PLM 835). In this embodiment, the linguistic vector is a singular composite measurement of class set noise (child class set linguistic noise value) such that the linguistic vector reflects the distance from PLM 835 to a linguistic marker, or the amount of work needed to achieve perfect matches. In this embodiment, the linguistic vector is a composite of post-editing factor noise and post-editing leverage noise. The post-editing factor noise represents the mechanical effort to remove linguistic noise contributed from the various translation supply chain stages, and the post-editing leverage noise is a measurement of the cognitive assessment of the best match. For example, if the post-editing leverage is 0.5, then 50% of the suggested matches are not accurate enough to correct (see FIG. 8 and corresponding text for further details).

At step 765, the linguistic analyzer engine computes a weighted sum linguistic noise for each MAJORKEY (major linguistic noise) using a formulas such as:

$$LinguisticNoise^M = \sum_{S}^{T} (_T LinguisticVector_S^M X (_T Total\_WORDS_S^M / Total\_WORDS^M))$$

where T=Match Type [EM, FM, MT].

In one embodiment, the major linguistic noise is the sum measurement of all class set noise (linguistic vectors) weighted by the respective class set percentage of words within a MAJORKEY. The major linguistic noise value represents the distance from a set of perfect matches (Linguistic Vector) weighted by the volume of words within a plurality of matches. If the linguistic vector (class set noise) of all class sets reflected a measurement of zero, then the major linguistic noise would reflect zero linguistic noise reflecting 100% perfect matches within the MAJORKEY sampled event data 170 within event store 175.

The linguistic analyzer engine then sums the weighted sum major linguistic nose across all major dimensions to compute a performance efficiency (e.g., translation supply chain linguistic noise value) at step 770 using a formula such as:

$$SupplyChainNoise = \sum_{i=1}^{m} \left( LinguisticNoise^m X \left( Total\_WORDS^m / \sum_{i=1}^{n} WORDS^M \right) \right)$$

where M=MAJORKEY (default=LOGNAME, shipment), m=each MAJORKEY, and n=total number of all events (MAJORKEY).

The linguistic analyzer engine evaluates the efficiency of a translation supply chain (step 775) based on the translation supply chain noise (from step 770) and processing ends at 780. In one embodiment, the translation supply chain noise evaluation involves the linguistic analyzer engine and an operational team providing analytical feedback to components and an operational assets/resources in the translation supply chain. In this embodiment, the linguistic analyzer engine evaluates how changes in operational assets/resources and components affect patterns in the translation supply chain. For example, the operational team may quantify changes in the supply chain noise as various machine translation service providers are added/deleted into the translation supply chain, or as various operational assets/resource are added/deleted or different methods are applied in the management of the operational assets/resources.

In another embodiment, by tracking the translation supply chain linguistic noise across all MAJORKEY instances over time, the linguistic analyzer engine and operational team may build a simple overall process behavior view such that the linguistic analyzer engine and operational team identifies boundary exception conditions and implements corrective action plans to minimize future occurrences of those exceptions. In addition, the linguistic analyzer engine and operational team may provide analytical feedback to the machine translation stage for investment decisions and selecting specific noise variables for which to improve.

FIG. 8 is an exemplary diagram depicting a two-dimensional graphical representation of a multi-dimensional linguistic noise coordinate system. Graph 800 plots linguistic markers according to post-editing leverage values (x-axis) and post-editing factor values (y-axis).

Graph 800 includes nine linguistic markers categorized by match type and match size. Circles represent large segment sizes, triangles represent medium segment sizes, and squares represent the small segment sizes. The thick-lined objects represent machine translations (MM), the dashed-lined objects represent fuzzy matches (FM), and the thin-lined objects represent exact matches (EM).

As such, L-MT 810 represents large segment machine translations, M-MT 812 represents medium segment machine translations, and S-MT 814 represents small segment machine translations. Likewise, L-FM 820 represents large segment fuzzy matches, M-FM 822 represents medium segment fuzzy matches, and S-FM 824 represents small segment fuzzy matches. Finally, L-EM 830 represents large segment exact matches, M-EM 832 represents medium segment exact matches, and S-EM 834 represents small segment exact matches. As can be seen, the exact match linguistic markers are closest to PLM 935 because they are typically better translations when compared against fuzzy matches or machine translations.

Graph 800 is one embodiment of a multidimensional linguistic noise coordinate system showing an exemplary set of linguistic markers and their corresponding linguistic vector(s) associated with class set event data 300. Linguistic vector 840, which corresponds to marker M-EM 832, reflects the linguistic noise contributed by the class set of medium-exact match events (M-EM 832) in event store 175. Post-editing factor noise 850 represents one dimension of the vector (class set noise) 840 based on measuring the mechanical effort used to eliminate the linguistic noise within the matches in the class set M-EM 832. For example, if all matches associated with the events of marker M-EM 832 were all perfect, then post-editing factor noise 850 would measure 0.0, reflecting zero mechanical effort to clean all the matches. Likewise, post-editing leverage noise 860 represents a second dimension of the vector (class set noise) 840 based on measuring the human cognitive assessments (decisions) across all the matches used within class set M-EM 832. For example, if all the matches associated with the events of marker M-EM 832 were all perfect, then the post-editing leverage noise dimension 860 would measure 1.0, reflecting 100% acceptance of all matches. Each marker (L-MT 810, M-MT 812, S-MT 814, L-FM 820, M-FM 822, S-FM 824, L-EM 830, M-EM 832, and S-EM 834) and their corresponding vectors from Perfect Linguistic Marker 835 point (1.0, 0.0) represents their respective contribution of linguistic noise, per class set, to the translation supply chain linguistic noise (computed in step 770).

Figure 9:
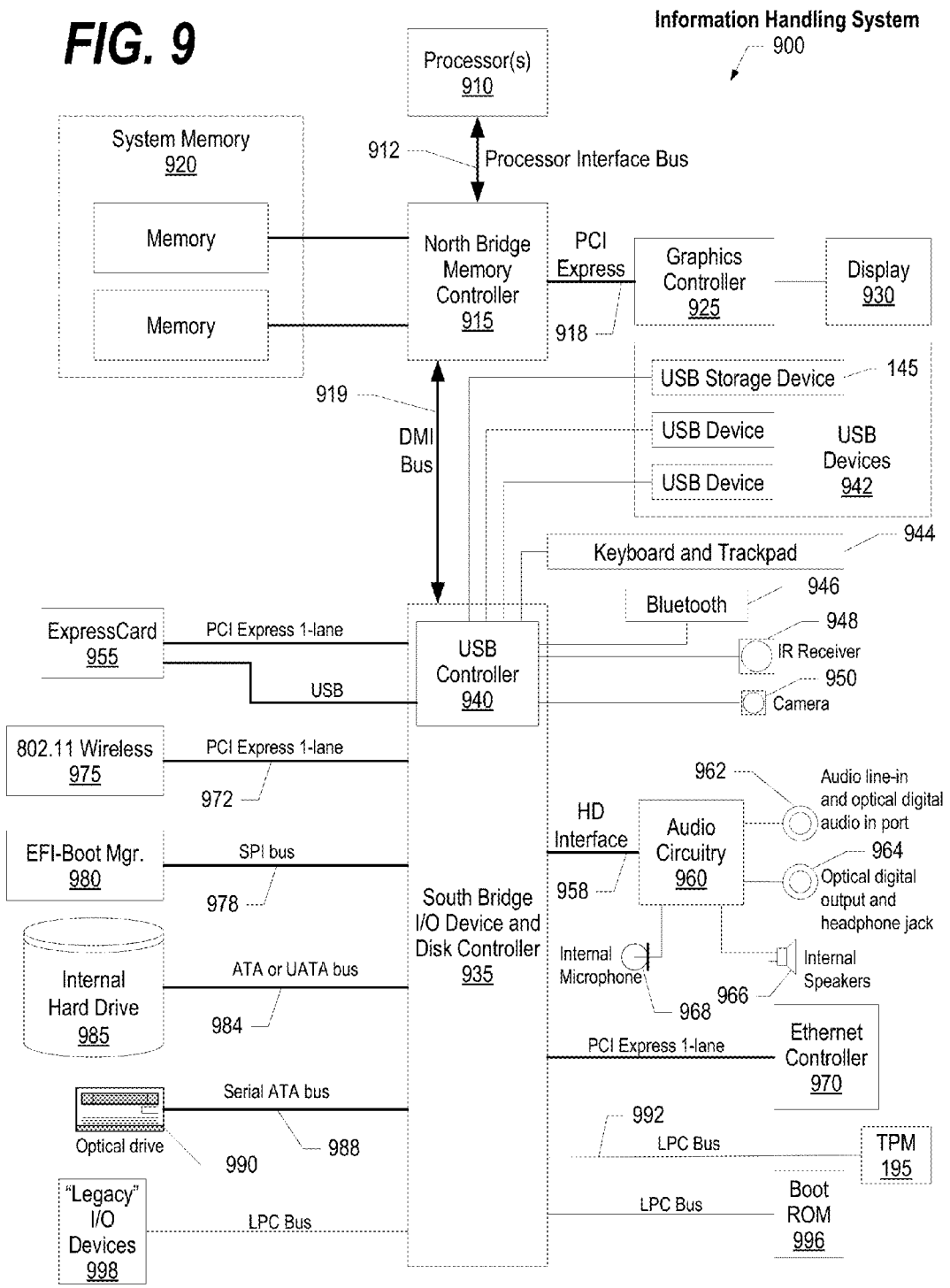
FIG. 9 is a block diagram of a data processing system in which the methods described herein can be implemented.

FIG. 9 illustrates information handling system 900, which is a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to communicate wirelessly between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

While FIG. 9 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 995) shown in FIG. 9 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 10.

Figure 10:
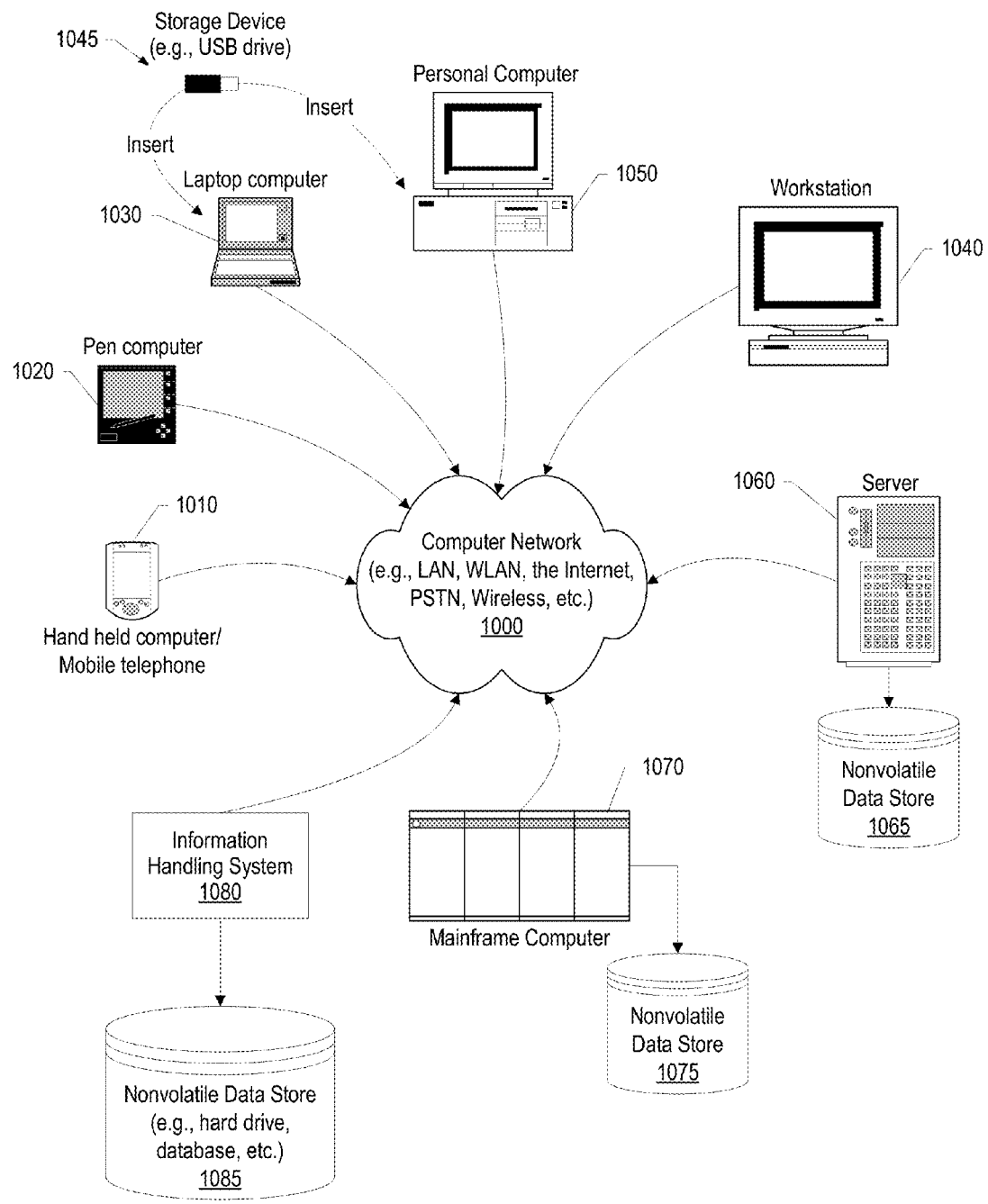
FIG. 10 provides an extension of the information handling system environment shown in FIG. 9 to illustrate that the methods described herein can be performed on a wide variety of information handling systems which operate in a networked environment.

FIG. 10 provides an extension of the information handling system environment shown in FIG. 9 to illustrate that the methods described herein can be performed on a wide variety of information handling systems that operate in a networked environment. Types of information handling systems range from small handheld devices, such as handheld computer/mobile telephone 1010 to large mainframe systems, such as mainframe computer 1070. Examples of handheld computer 1010 include personal digital assistants (PDAs), personal entertainment devices, such as MP3 players, portable televisions, and compact disc players. Other examples of information handling systems include pen, or tablet, computer 1020, laptop, or notebook, computer 1030, workstation 1040, personal computer system 1050, and server 1060. Other types of information handling systems that are not individually shown in FIG. 10 are represented by information handling system 1080. As shown, the various information handling systems can be networked together using computer network 1000. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 10 depicts separate nonvolatile data stores (server 1060 utilizes nonvolatile data store 1065, mainframe computer 1070 utilizes nonvolatile data store 1075, and information handling system 1080 utilizes nonvolatile data store 1085). The nonvolatile data store can be a component that is external to the various information handling systems or can be internal to one of the information handling systems. In addition, removable nonvolatile storage device 945 can be shared among two or more information handling systems using various techniques, such as connecting the removable nonvolatile storage device 945 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory, instructions stored in the memory, and a processor, the method comprising:
    computing, by the processor using a first set of instructions stored in the memory, a leverage value of a language translation supply chain, wherein the leverage value corresponds to an amount of suggested translations, from a plurality of suggested translations, that are accepted by a user that results in a set of accepted translations;
    computing, by the processor using a second set of instructions stored in the memory, a factor value of the language translation supply chain, wherein the factor value indicates a productivity of the user to convert the set of accepted translation into a set of final translations;
    determining, by the processor, a performance efficiency of the language translation supply chain based upon the leverage value and the factor value; and
    evaluating the language translation supply chain based upon the performance efficiency.

2. The method of claim 1 wherein the plurality of suggested translations correspond to a plurality of child class sets, the method further comprising:
    computing a child class set linguistic noise value for each of the plurality of child class sets using a corresponding child class leverage value and a child class factor value, resulting in a plurality of child class set linguistic noise values;
    combining the plurality of child class set linguistic noise values, resulting in a translation supply chain linguistic noise value; and
    utilizing the translation supply chain linguistic noise value during the performance efficiency determination of the language translation supply chain.

3. The method of claim 2 further comprising:
    selecting one of the plurality of child class sets;
    identifying a total amount of words included in the plurality of suggested translations that each correspond to the selected child class set;
    identifying a total amount of accepted words included in the set of accepted translations that each correspond to the selected child class set; and
    computing the child class leverage value of the selected child class set using the identified total amount of words and the total amount of accepted words.

4. The method of claim 2 wherein each of the plurality of suggested translations corresponds to one of a plurality of original segments written in a first language and one of a plurality of corresponding translation segments written in a second language, the method further comprising:
    designating a set of the plurality of original segments as a set of placebo segments, wherein the translation supply chain prevents generation of a suggested translation for each of the segments included in the set of placebo segments;
    computing a placebo baseline productivity value based upon the set of placebo segments that do not correspond to one of the plurality of suggested translations;
    selecting one of the plurality of child class sets;
    computing a child class match productivity value of the selected child class based upon the set of accepted translations that each correspond to the selected child class set; and
    computing the child class factor value of the selected child class set using the placebo baseline productivity value and the child class match productivity value.

5. The method of claim 4 further comprising:
    tracking one or more first user actions of the user to generate one or more final translations corresponding to the set of placebo segments, the one or more first user actions utilized to compute the placebo baseline productivity value; and
    tracking one or more second user actions of the user to convert one or more of the set of accepted translations to one or more of the set of final translations, the one or more second user actions utilized to compute the child class match productivity value.

6. The method of claim 2 wherein at least one of the plurality of child class sets corresponds to a match type selected from the group consisting of an auto exact match type, an exact match type, a fuzzy match type, and a machine translation match type.

7. The method of claim 1 wherein the language translation supply chain comprises one or more first stages and a second stage that is subsequent to the one or more first stages, the method further comprising:
    generating the plurality of suggested translations by the one or more first stages;
    converting, by the second stage, the set of accepted translations into the set of final translations; and
    adjusting the one or more first stages in response to the evaluating to improve the performance efficiency of the language translation supply chain.

8. An information handling system comprising:
    one or more processors;
    a memory coupled to at least one of the processors;
    a set of computer program instructions stored in the memory and executed by at least one of the processors in order to perform actions of:
        computing a leverage value of a language translation supply chain, wherein the leverage value corresponds to an amount of suggested translations, from a plurality of suggested translations, that are accepted by a user that results in a set of accepted translations;
        computing a factor value of the language translation supply chain, wherein the factor value indicates a productivity of the user to convert the set of accepted translation into a set of final translations;
        determining a performance efficiency of the language translation supply chain based upon the leverage value and the factor value; and evaluating the language translation supply chain based upon the performance efficiency.

9. The information handling system of claim 8 wherein the plurality of suggested translations correspond to a plurality of child class sets, and wherein the processors perform additional actions comprising:
   computing a child class set linguistic noise value for each of the plurality of child class sets using a corresponding child class leverage value and a child class factor value, resulting in a plurality of child class set linguistic noise values;
   combining the plurality of child class set linguistic noise values, resulting in a translation supply chain linguistic noise value; and
   utilizing the translation supply chain linguistic noise value during the performance efficiency determination of the language translation supply chain.

10. The information handling system of claim 9 wherein the processors perform additional actions comprising:
   selecting one of the plurality of child class sets;
   identifying a total amount of words included in the plurality of suggested translations that each correspond to the selected child class set;
   identifying a total amount of accepted words included in the set of accepted translations that each correspond to the selected child class set; and
   computing the child class leverage value of the selected child class set using the identified total amount of words and the total amount of accepted words.

11. The information handling system of claim 9 wherein each of the plurality of suggested translations corresponds to one of a plurality of original segments written in a first language and one of a plurality of corresponding translation segments written in a second language, and wherein the processors perform additional actions comprising:
   designating a set of the plurality of original segments as a set of placebo segments, wherein the translation supply chain prevents generation of a suggested translation for each of the segments included in the set of placebo segments;
   computing a placebo baseline productivity value based upon the set of placebo segments that do not correspond to one of the plurality of suggested translations;
   selecting one of the plurality of child class sets;
   computing a child class match productivity value of the selected child class based upon the set of accepted translations that each correspond to the selected child class set; and
   computing the child class factor value of the selected child class set using the placebo baseline productivity value and the child class match productivity value.

12. The information handling system of claim 11 wherein the processors perform additional actions comprising:
   tracking one or more first user actions of the user to generate one or more final translations corresponding to the set of placebo segments, the one or more first user actions utilized to compute the placebo baseline productivity value; and
   tracking one or more second user actions of the user to convert one or more of the set of accepted translations to one or more of the set of final translations, the one or more second user actions utilized to compute the child class match productivity value.

13. The information handling system of claim 9 wherein at least one of the plurality of child class sets corresponds to a match type selected from the group consisting of an auto exact match type, an exact match type, a fuzzy match type, and a machine translation match type.

14. The information handling system of claim 8 wherein the language translation supply chain comprises one or more first stages and a second stage that is subsequent to the one or more first stages, and wherein the processors perform additional actions comprising:
   generating the plurality of suggested translations by the one or more first stages;
   converting, by the second stage, the set of accepted translations into the set of final translations; and
   adjusting the one or more first stages in response to the evaluating to improve the performance efficiency of the language translation supply chain.

15. A computer program product comprising a computer readable storage medium having program instructions stored therewith, the program instructions executable by a processor to cause an information handling system to perform a method comprising:
   computing a leverage value of a language translation supply chain, wherein the leverage value corresponds to an amount of suggested translations, from a plurality of suggested translations, that are accepted by a user that results in a set of accepted translations;
   computing a factor value of the language translation supply chain, wherein the factor value indicates a productivity of the user to convert the set of accepted translation into a set of final translations;
   determining a performance efficiency of the language translation supply chain based upon the leverage value and the factor value; and
   evaluating the language translation supply chain based upon the performance efficiency.

16. The computer program product of claim 15 wherein the plurality of suggested translations correspond to a plurality of child class sets, and wherein the information handling system performs further actions comprising:
   computing a child class set linguistic noise value for each of the plurality of child class sets using a corresponding child class leverage value and a child class factor value, resulting in a plurality of child class set linguistic noise values;
   combining the plurality of child class set linguistic noise values, resulting in a translation supply chain linguistic noise value; and
   utilizing the translation supply chain linguistic noise value during the performance efficiency determination of the language translation supply chain.

17. The computer program product of claim 16 wherein the information handling system performs further actions comprising:
   selecting one of the plurality of child class sets;
   identifying a total amount of words included in the plurality of suggested translations that each correspond to the selected child class set;
   identifying a total amount of accepted words included in the set of accepted translations that each correspond to the selected child class set; and
   computing the child class leverage value of the selected child class set using the identified total amount of words and the total amount of accepted words.

18. The computer program product of claim 16 wherein each of the plurality of suggested translations corresponds to one of a plurality of original segments written in a first language and one of a plurality of corresponding translation segments written in a second language, and wherein the information handling system performs further actions comprising:

designating a set of the plurality of original segments as a set of placebo segments, wherein the translation supply chain prevents generation of a suggested translation for each of the segments included in the set of placebo segments;

computing a placebo baseline productivity value based upon the set of placebo segments that do not correspond to one of the plurality of suggested translations;

selecting one of the plurality of child class sets;

computing a child class match productivity value of the selected child class based upon the set of accepted translations that each correspond to the selected child class set; and computing the child class factor value of the selected child class set using the placebo baseline productivity value and the child class match productivity value.

19. The computer program product of claim 18 wherein the information handling system performs further actions comprising:

tracking one or more first user actions of the user to generate one or more final translations corresponding to the set of placebo segments, the one or more first user actions utilized to compute the placebo baseline productivity value; and tracking one or more second user actions of the user to convert one or more of the set of accepted translations to one or more of the set of final translations, the one or more second user actions utilized to compute the child class match productivity value.

20. The computer program product of claim 15 wherein the language translation supply chain comprises one or more first stages and a second stage that is subsequent to the one or more first stages, and wherein the information handling system performs further actions comprising:

generating the plurality of suggested translations by the one or more first stages;

converting, by the second stage, the set of accepted translations into the set of final translations; and adjusting the one or more first stages in response to the evaluating to improve the performance efficiency of the language translation supply chain.

* * * * *